United States Patent
Richter et al.

(10) Patent No.: US 11,447,596 B2
(45) Date of Patent: *Sep. 20, 2022

(54) POLYURETHANE WITH IMPROVED TEAR STRENGTH

(71) Applicant: BASF SE, Ludwigshafen am Rhein (DE)

(72) Inventors: Sebastian Richter, Lemfoerde (DE); Zeljko Tomovic, Lemfoerde (DE); Kathrin Cohen, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 163 days.

This patent is subject to a terminal disclaimer.

(21) Appl. No.: 16/462,977

(22) PCT Filed: Dec. 22, 2017

(86) PCT No.: PCT/EP2017/084423
§ 371 (c)(1),
(2) Date: May 22, 2019

(87) PCT Pub. No.: WO2018/115460
PCT Pub. Date: Jun. 28, 2018

(65) Prior Publication Data
US 2019/0322794 A1   Oct. 24, 2019

(30) Foreign Application Priority Data
Dec. 23, 2016 (EP) .................... 16206700

(51) Int. Cl.
| | |
|---|---|
| C08G 18/66 | (2006.01) |
| C08G 18/32 | (2006.01) |
| C08G 18/42 | (2006.01) |
| C08G 18/73 | (2006.01) |
| C08G 18/76 | (2006.01) |
| B29C 45/00 | (2006.01) |
| C08G 18/75 | (2006.01) |
| B29K 67/00 | (2006.01) |

(52) U.S. Cl.
CPC ....... *C08G 18/664* (2013.01); *C08G 18/3206* (2013.01); *C08G 18/4216* (2013.01); *C08G 18/73* (2013.01); *C08G 18/7671* (2013.01); *B29C 45/0001* (2013.01); *B29K 2067/003* (2013.01)

(58) Field of Classification Search
None
See application file for complete search history.

(56) References Cited

U.S. PATENT DOCUMENTS

| | | | |
|---|---|---|---|
| 4,062,825 A | 12/1977 | Watabe et al. | |
| 4,186,257 A * | 1/1980 | Blahak | C08G 18/10 521/159 |
| 4,202,950 A | 5/1980 | Statton | |
| 4,228,249 A | 10/1980 | Blahak et al. | |
| 4,374,935 A * | 2/1983 | Decker | C08G 18/4018 521/914 |
| 5,496,496 A | 3/1996 | Kajita et al. | |
| 2004/0171767 A1* | 9/2004 | Pohlmann | C08G 18/664 525/453 |
| 2015/0291757 A1 | 10/2015 | Woutters et al. | |
| 2019/0359823 A1 | 11/2019 | Tomovic et al. | |

FOREIGN PATENT DOCUMENTS

| | | | |
|---|---|---|---|
| EP | 1 529 814 A2 | 5/2005 | |
| EP | 1 556 433 A0 | 7/2005 | |
| EP | 2 687 552 A1 | 1/2014 | |
| GB | 1447644 A * | 8/1976 | ............. C08G 18/46 |
| WO | 2004/037891 A1 | 5/2004 | |

OTHER PUBLICATIONS

Sniezko et al., "Terephthalate-adipate copolyesterdiols in the synthesis of urethane elastomers," Polimery, vol. 25(4), p. 141-145, (1980) (Year: 1980).*
Sniezko et al., "Effect of the segmental structure of terephthalic-adipic copolyesters on the properties of urethane elastomers," Polimery, vol. 26(9), p. 358-59, (1981 (Year: 1981).*
Kunststoff-Handbuch, Band 7, "Polyurethane", Carl Hanser Verlag,3. Auflage 1993, Kapitel 3.1, pp. 58-75 with cover page.
Carl Hanser Verlag, Kunststoff-Handbuch, Band 7, "Polyurethane", 1. Auflage1966, S. 103-113, pp. 96-120 with cover pages.
International Preliminary Report on Patentability dated Jun. 27, 2019 in PCT/EP2017/084423 (submitting English translation only), citing document AD therein, 5 pages.
U.S. Appl. No. 16/349,798, filed May 14, 2019, 2019/0359823, Tomovic et al.

* cited by examiner

*Primary Examiner* — Randy P Gulakowski
*Assistant Examiner* — Ha S Nguyen
(74) *Attorney, Agent, or Firm* — Grüneberg and Myers PLLC

(57) ABSTRACT

The present invention relates to a thermoplastic polyurethane obtainable or obtained by reacting a polyisocyanate composition, a chain extender, and a polyol composition, wherein the polyol composition comprises a polyol (P1) which has a molecular weight Mw in the range from 1500 to 2500 g/mol and has at least one aromatic polyester block (B1). The present invention further relates to a process for producing a shaped body comprising such a thermoplastic polyurethane, and to shaped bodies obtainable or obtained by a process of the invention.

12 Claims, No Drawings

POLYURETHANE WITH IMPROVED TEAR STRENGTH

The present invention relates to a thermoplastic polyurethane obtainable or obtained by reacting a polyisocyanate composition, a chain extender, and a polyol composition, wherein the polyol composition comprises a polyol (P1) which has a molecular weight Mw in the range from 1500 to 2500 g/mol and has at least one aromatic polyester block (B1). The present invention further relates to a process for producing a shaped body comprising such a thermoplastic polyurethane, and to shaped bodies obtainable or obtained by a process of the invention.

Thermoplastic polyurethanes for various applications are known in principle from the prior art. By the variation in the feedstocks, it is possible to obtain different profiles of properties.

For many applications, high tear propagation resistance in particular is required, with a simultaneous requirement for good cold flexibility with otherwise good mechanical properties of the materials.

U.S. Pat. No. 5,496,496 discloses a process for producing a polyurethane elastomer comprising the reaction of a polyisocyanate and a polyol or an isocyanate-terminated prepolymer obtainable by reacting the polyisocyanate with the polyol and further with a specific polyol mixture comprising a diol and a triol having a hydroxyl equivalent weight of 60 to 500. This affords polyurethane elastomers having improved tensile strength and tear propagation resistance and otherwise good mechanical properties.

U.S. Pat. No. 4,062,825 discloses a polyurethane composition having high tear strength, which is obtained by homogeneously mixing 20 to 50 parts by weight of finely divided acidic silicon dioxide particles, 100 parts by weight of isocyanate-terminated prepolymer and corresponding portions of further additives, and curing the mixture. The ratio (l/d) of the average chain separation (l) between adjacent crosslinking points of the cured polyurethane chains to the average size (d) of the finely divided particles of silicon dioxide here is in the range from 2.5 to 20.

U.S. Pat. No. 4,202,950 relates to polyurethane compositions having improved tensile strength and tear resistance, which are produced by graft polymerization of an ethylenically unsaturated monomer and subsequent reaction of the resulting graft copolymer with a polyfunctional organic isocyanate. Conventional catalysts and polymerization methods are used.

EP 2 687 552 A1 discloses nanophase polyurea particles or a dispersion of polyurea particles suitable for improving the mechanical properties of a polyurethane material.

Proceeding from the prior art, one object underlying the present invention was that of providing a thermoplastic polyurethane which, as well as a high propagation resistance, also has a glass transition temperature below 5° C. A further object of the present invention was to provide a thermoplastic polyurethane having high tear propagation resistance and a glass transition temperature below 5° C. or even below 0° C., which can be produced in a simple and inexpensive manner in a one-shot process.

According to the invention, this object is achieved by a thermoplastic polyurethane obtainable or obtained by reacting at least components (i) to (iii):
  (i) a polyisocyanate composition,
  (ii) at least one chain extender, and
  (iii) at least one polyol composition,
wherein the polyol composition comprises at least one polyol (P1) which has a molecular weight Mw in the range from 1500 to 2500 g/mol and has at least one aromatic polyester block (B1).

According to the invention, the polyol (P1) has a molecular weight Mw in the range from 1500 to 2500 g/mol. In addition, the polyol (P1) has an aromatic polyester block (B1). In the context of the present invention, this is understood to mean that the aromatic polyester block (B1) may be a polyester of an aromatic dicarboxylic acid and an aliphatic diol or a polyester of an aliphatic dicarboxylic acid and an aromatic diol. Preferably, the aromatic polyester block (B1) in the context of the present invention is a polyester of an aromatic dicarboxylic acid and an aliphatic diol. Suitable aromatic dicarboxylic acids are, for example, terephthalic acid, isophthalic acid or phthalic acid, preferably terephthalic acid. Accordingly, suitable polyols (P1) in the context of the present invention are those that have, for example, at least one polyethylene terephthalate block or at least one polybutylene terephthalate block, where the number of repeat units in the aromatic systems is at least 2 in series. Preferably, the aromatic polyester block (B1) is prepared in a separate step prior to the further conversion to polyol (P1) in order to assure a sufficient block length of the repeat units of the aromatic systems.

According to the invention, the thermoplastic polyurethane may especially be a compact thermoplastic polyurethane. Accordingly, the present invention, in a further embodiment, relates to a thermoplastic polyurethane as described above, wherein the thermoplastic polyurethane is a compact thermoplastic polyurethane.

In a further embodiment, the present invention accordingly relates to a thermoplastic polyurethane as described above, wherein the aromatic polyester block (B1) is a polyester of an aromatic dicarboxylic acid and an aliphatic diol. In a further embodiment, the present invention also relates to a thermoplastic polyurethane as described above, wherein the aromatic polyester block (B1) is a polyethylene terephthalate block or a polybutylene terephthalate block. In a further preferred embodiment, the present invention further relates to a thermoplastic polyurethane as described above, wherein the aromatic polyester block (B1) is a polyethylene terephthalate block.

It has been found that, surprisingly, the use of polyols (P1) having a molecular weight Mw in the range from 1500 to 2500 g/mol and having at least one aromatic polyester block (B1) affords thermoplastic polyurethanes that have very good tear propagation resistance and a low glass transition temperature.

In the context of the present invention, suitable polyols (P1) are especially those that are based on aromatic polyesters, such as polybutylene terephthalate (PBT) or polyethylene terephthalate (PET). Preferably, the polyol (P1) is prepared here by reacting the aromatic polyester with dicarboxylic acids and diols to give mixed aromatic/aliphatic polyester diols. For example, it is possible in the context of the present invention to react the aromatic polyester in solid or liquid form with dicarboxylic acids and diols. According to the invention, the aromatic polyester used typically has a higher molecular weight than the blocks (B1) present in the polyol (P1).

Polyester polyols (P1) suitable in accordance with the invention typically comprise 10% to 50% by weight, preferably 20% to 40% by weight, more preferably 25% to 35% by weight, of the aromatic polyester blocks (B1), based in each case on the overall polyester polyol (P1). In a further embodiment, the present invention accordingly relates to a thermoplastic polyurethane as described above, wherein the polyol (P1) includes 10% to 50% by weight of the aromatic polyester blocks (B1), based on the overall polyester polyol (P1).

According to the invention, the polyol (P1) has a molecular weight Mw in the range from 1500 to 2500, preferably in the range from 1700 to 2300, more preferably in the range from 2000 to 2300 and most preferably in the range from 2150 to 2250 g/mol. In a further embodiment, the present invention accordingly relates to a thermoplastic polyurethane as described above, wherein the polyol (P1) has a molecular weight Mw in the range from 1700 to 2300 g/mol.

The molecular weight (Mw) is calculated using the following formula, where z is the functionality of the polyester polyol and z=2:

Mw=1000 mg/g·[(z·56.106 g/mol)/(OHN [mg/g])]

In the preparation of the polyols (P1), preferably aromatic polyesters such as polybutylene terephthalate (PBT) or polyethylene terephthalate (PET) are used. Polyethylene terephthalate is a thermoplastic polymer prepared by polycondensation. The quality of the PET, and its physical properties such as toughness or durability, are dependent on the chain length. Older PET synthesis methods are based on the transesterification of dimethyl terephthalate with ethylene glycol. Nowadays, PET is synthesized almost exclusively by direct esterification of terephthalic acid with ethylene glycol. In the same way, terephthalic acid can also be reacted with butane-1,4-diol to give polybutylene terephthalate (PBT). This likewise thermoplastic polymer is available under brands such as CRASTIN® (DuPont), POCAN® (Lanxess), ULTRADUR® (BASF) or ENDURAN® and VESTODUR® (SABIC IP). Its chemical and physical/technical properties correspond largely to those of PET.

According to the invention, it is also possible to use aromatic polyesters such as polybutylene terephthalate (PBT) or polyethylene terephthalate (PET) that are obtained from recycling processes. For example, polyethylene terephthalate can be used in the form of flakes that are obtained from plastic recycling processes. Materials of this kind typically have molecular weights of about 12,000 g/mol.

According to the invention, suitable polyols (P1) can also be obtained using aromatic polyesters such as polybutylene terephthalate or polyethylene terephthalate with higher molecular weight and diols by transesterification. Suitable reaction conditions are known per se to those skilled in the art.

In addition, in the preparation of the polyols (P1), diols having 2 to 10 carbon atoms, for example ethanediol, propanediol, butanediol, pentanediol, hexanediol or di- or triethylene glycol, further preferably butanediol, hexanediol or diethylene glycol, especially diethylene glycol or mixtures thereof, are used. It is also possible to use short polyether diols, for example PTHF 250 or PTHF 650 or a short-chain polypropylene glycol such as a PPG 500. Dicarboxylic acids used may, for example, be linear or branched-chain diacids having four to 12 carbon atoms or mixtures thereof. Preference is given to using adipic acid, succinic acid, glutaric acid or sebacic acid or a mixture of the acids mentioned. Particular preference is given in the context of the present invention to adipic acid. According to the invention, in the preparation of the polyols (P1), it is also possible to use further polyester diols as feedstocks, for example butanediol adipate or ethylene adipate.

It is essential in the context of the present invention that, in the preparation of the thermoplastic polyurethane, at least one chain extender and the polyol composition as described above are used.

According to the invention, it is possible to use one chain extender, but it is also possible to use mixtures of different chain extenders.

Chain extenders used in the context of the present invention may, for example, be compounds having hydroxyl or amino groups, especially having 2 hydroxyl or amino groups. According to the invention, however, it is also possible that mixtures of different compounds are used as chain extenders. According to the invention, the average functionality of the mixture is 2.

Preference is given in accordance with the invention to using compounds having hydroxyl groups as chain extenders, especially diols. It is preferably possible to use aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol, hexane-1,6-diol. It is also possible to use aromatic compounds such as hydroxyquinone bis(2-hydroxyethyl) ether.

According to the invention, it is also possible to use compounds having amino groups, for example diamines. It is likewise possible to use mixtures of diols and diamines.

The chain extender is preferably a diol having a molecular weight Mw<220 g/mol. According to the invention, it is possible that only one diol having a molecular weight Mw<220 g/mol is used for preparation of the transparent thermoplastic polyurethane.

In a further embodiment, more than one diol is used as chain extender. It is thus also possible to use mixtures of chain extenders, where at least one diol has a molecular weight Mw<220 g/mol. If more than one chain extender is used, the second or further chain extender may also have a molecular weight of 220 g/mol.

In a further embodiment, the chain extender is selected from the group consisting of butane-1,4-diol and hexane-1,6-diol.

In a further embodiment, the present invention accordingly relates to a thermoplastic polyurethane as described above, wherein the chain extender used in (ii) is a diol having a molecular weight Mw<220 g/mol.

The chain extender, especially the diol having a molecular weight Mw<220 g/mol, is preferably used in a molar ratio in the range from 40:1 to 1:10 relative to the polyol (P1). Preferably, the chain extender and the polyol (P1) are used in a molar ratio in the range from 20:1 to 1:9, further preferably in the range from 10:1 to 1:8, for example in the range from 5:1 to 1:5, or else in the range from 4:1 to 1:4, further preferably in the range from 3:1 to 1:2.

In a further embodiment, the present invention accordingly relates to a thermoplastic polyurethane as described above, wherein the chain extender used in (ii) and the polyol (P1) present in the polyol composition are used in a molar ratio of 40:1 to 1:10.

According to the invention, the polyol composition may comprise further polyols as well as the at least one polyol (P1). Accordingly, in the context of the present invention, it is also possible to use at least one chain extender and a polyol composition comprising at least one polyol (P1) as described above and at least one further polyol.

The further polyols preferably do not have any polyethylene terephthalate block. In another embodiment, the present invention accordingly provides a thermoplastic polyurethane as described above, wherein the polyol composition comprises a further polyol selected from the group consisting of polyetherols, polyesterols, polycaprolactone alcohols and hybrid polyols.

Higher molecular weight compounds having hydrogen atoms reactive toward isocyanates that are used may be the commonly known polyols having compounds reactive toward isocyanates.

Polyols are fundamentally known to those skilled in the art and described for example in "Kunststoffhandbuch, Band 7, Polyurethane" [Plastics Handbook, volume 7, Polyurethanes], Carl Hanser Verlag, 3rd edition 1993, chapter 3.1. Particular preference is given to using polyesterols or polyetherols as polyols. Particular preference is given to polyester polyols. It is likewise possible to use polycarbonates. Copolymers may also be used in the context of the present invention. The number-average molecular weight of polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

They preferably have an average functionality with respect to isocyanates of 1.8 to 2.3, more preferably 1.9 to 2.2, especially 2.

Polyesterols used may be polyesterols based on diacids and diols. Diols used are preferably diols having 2 to 10 carbon atoms, for example ethanediol, propanediol, butanediol, pentanediol, hexanediol or di- or triethylene glycol, especially butane-1,4-diol or mixtures thereof. Diacids used may be any known diacids, for example linear or branched-chain diacids having four to 12 carbon atoms or mixtures thereof. Preference is given to using adipic acid as diacid.

Preferred polyetherols are in accordance with the invention polyethylene glycols, polypropylene glycols and polytetrahydrofurans.

In a particularly preferred embodiment, the polyol is a polytetrahydrofuran (PTHF) having a molecular weight in the Mw range of 600 g/mol to 2500 g/mol.

According to the invention, as well as PTHF, various other polyethers are suitable, but polyesters, block copolymers and hybrid polyols, for example poly(ester/amide), are also usable.

Preferably, the polyols used have an average functionality between 1.8 and 2.3, preferably between 1.9 and 2.2, especially 2. Preferably, the polyols used in accordance with the invention have solely primary hydroxyl groups.

According to the invention, the polyol may be used in pure form or in the form of a composition comprising the polyol and at least one solvent. Suitable solvents are known per se to the person skilled in the art.

The additional polyol is preferably used in a molar ratio in the range from 10:1 to 1:10 relative to the polyol (P1). In further-preferred embodiments, the further polyol and the polyol (P1) are used in a molar ratio in the range from 9:1 to 1:9, further preferably in the range from 5:1 to 1:5.

According to the invention, at least one isocyanate is used. According to the invention, it is also possible to use mixtures of two or more polyisocyanates.

Preferred polyisocyanates in the context of the present invention are diisocyanates, especially aliphatic or aromatic diisocyanates, further preferably aromatic diisocyanates.

In a further embodiment, the present invention accordingly relates to a thermoplastic polyurethane as described above, wherein the polyisocyanate is an aliphatic or aromatic diisocyanate.

In addition, in the context of the present invention, isocyanate components used may be prereacted prepolymers in which some of the OH components have been reacted with an isocyanate in a preceding reaction step. These prepolymers are reacted with the remaining OH components in a further step, the actual polymer reaction, and then form the thermoplastic polyurethane. The use of prepolymers makes it possible also to use OH components having secondary alcohol groups.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcyclohexane or mixtures thereof.

In a further embodiment, the present invention accordingly relates to a process as described above, wherein the polyisocyanate is selected from the group consisting of methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI) or mixtures thereof.

Suitable aromatic diisocyanates are especially diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate.

Particularly preferred isocyanates in the context of the present invention are diphenylmethane 2,2'-, 2,4'- and/or 4,4'-diisocyanate (MDI) and mixtures thereof.

Preferred examples of higher-functionality isocyanates are triisocyanates, e.g. triphenylmethane 4,4',4"-triisocyanate, and also the cyanurates of the aforementioned diisocyanates, and the oligomers obtainable by partial reaction of diisocyanates with water, for example the biurets of the aforementioned diisocyanates, and also oligomers obtainable by controlled reaction of semi-blocked diisocyanates with polyols having an average of more than 2 and preferably 3 or more hydroxyl groups.

In a further embodiment, the present invention relates to a process as described above, wherein the polyisocyanate is an aliphatic diisocyanate.

According to the invention, the polyisocyanate may be used in pure form or in the form of a composition comprising the polyisocyanate and at least one solvent. Suitable solvents are known to those skilled in the art. Suitable examples are nonreactive solvents such as ethyl acetate, methyl ethyl ketone, tetrahydrofuran and hydrocarbons.

According to the invention, in the reaction of the at least one aliphatic polyisocyanate, the at least one chain extender, and the at least one polymer composition, it is possible to add further feedstocks, for example catalysts or auxiliaries and additives.

Suitable auxiliaries and additives are known per se to those skilled in the art. Examples include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable assistants and additives may be found, for example in Kunststoffhandbuch [Plastics Handbook], volume VII, published by Vieweg and Höchtlen, Carl Hanser Verlag, Munich 1966 (p. 103-113).

Preference is further given to using at least one plasticizer.

Plasticizers used may be any of the plasticizers known for use in TPUs. These include, for example, compounds comprising at least one phenolic group. Such compounds are described in EP 1 529 814 A2. Moreover, it is also possible, for example, to use polyesters having a molecular weight of about 100 to 1500 g/mol based on dicarboxylic acid, benzoic acid and at least one di- or triol, preferably a diol. Diacid components used are preferably succinic acid, glutaric acid, adipic acid, suberic acid, azelaic acid, decanedicarboxylic acid, maleic acid, fumaric acid, phthalic acid, isophthalic acid and/or terephthalic acid, and diols used are preferably ethane-1,2-diol, diethylene glycol, propane-1,2-diol, propane-1,3-diol, dipropylene glycol, butane-1,4-diol, pentane-1,5-diol and/or hexane-1,6-diol. The ratio here of dicarboxylic acid to benzoic acid is preferably 1:10 to 10:1. Such plasticizers are described in detail, for example, in EP 1 556 433 A1. Particular preference is also given to plasticizers based on citric esters, especially triethyl citrate, triacetyl triethyl citrate, tri(n-butyl) citrate, acetyl tri(n-butyl) citrate and acetyl tri(2-ethylhexyl) citrate. Further preferred plasticizers are triacetin, diisononyl cyclohexane-1,2-dicarboxylate, 2,2,4-trimethylpentane-1,3-diol diisobutyrate, tri-2-ethylhexyl trimellitate, dibutoxyethyl phthalate, mixture of phenyl (C10-C21)alkanesulfonate, dipropylene glycol dibenzoate, tri-2-ethylhexyl trimellitate, N-dodecyl-2-pyrrolidone, isodecyl benzoate, mixture of diphenyl cresyl phosphate 42-47%, triphenyl phosphate 20-24%, bis(methylphenyl) phenylphosphate 20-24% and tricresyl phosphate 4-6%, and diethylhexyl adipate, aliphatic fatty acid esters, triethylene glycol di(2-ethylhexanoate) and dioctyl terephthalate.

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyls such as tin(II) isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanate esters, bismuth compounds, such as bismuth alkyl compounds, preferably bismuth neodecanoate or similar, or iron compounds, preferably iron(III) acetylacetonate.

In a preferred embodiment the catalysts are selected from tin compounds and bismuth compounds, more preferably tin alkyl compounds or bismuth alkyl compounds. Tin(II) isooctoate and bismuth neodecanoate are particularly suitable.

The catalysts are typically employed in amounts of 3 ppm to 2000 ppm, preferably 10 ppm to 1000 ppm, more preferably 20 ppm to 500 ppm and most preferably 30 ppm to 300 ppm.

In a further aspect, the present invention also relates to a process for producing a shaped body (SC) comprising the following steps:
(a) preparing a thermoplastic polyurethane comprising the reaction of
  (i) at least one polyisocyanate composition,
  (ii) at least one chain extender, and
  (iii) at least one polyol composition,
  wherein the polyol composition comprises at least one polyol (P1) which has a molecular weight Mw in the range from 1500 to 2500 g/mol and has at least one aromatic polyester block (B1);
(b) producing a shaped body (SC) from the thermoplastic polyurethane.

The process of the invention comprises steps (a) and (b). First of all, in step (a), a thermoplastic polyurethane is prepared by reacting at least one polyisocyanate composition, at least one chain extender and at least one polyol composition. According to the invention, this polyol composition comprises at least one polyol (P1) which has a molecular weight Mw in the range from 1500 to 2500 g/mol and which has at least one aromatic polyester block (B1) as defined above, especially a polyethylene terephthalate block.

In step (b), a shaped body (SC) is produced from the thermoplastic polyurethane obtained in step (a). In the context of the present invention, the shaped body (SC) may also, for example, be a foil. In the context of the present invention, the shaped body (SC) can be produced by all customary methods, for example by extrusion, injection molding or sintering methods or from solution.

In a further embodiment, the present invention accordingly relates to a process as described above, wherein the shaped body (SC) is produced in step (b) by means of extrusion, injection molding or sintering methods or from solution.

The process in step (a) can in principle be conducted under the reaction conditions that are known per se.

In a preferred embodiment, the process in step (a) is conducted at elevated temperatures relative to ambient temperature, further preferably in the range between 50° C. and 200° C., more preferably in the range from 55° C. to 150° C., especially in the range from 60° C. to 120° C.

According to the invention, the heating can be effected in any suitable manner known to the person skilled in the art, preferably by electrical heating, heating via heated oil, heated polymer fluids or water, induction fields, hot air or IR radiation.

The resultant thermoplastic polyurethanes are processed in accordance with the invention to give a shaped body (SC). The process accordingly comprises step (a) and step (b). According to the invention, the process may comprise further steps, for example thermal treatments.

By the process of the invention, a shaped body (SC) is obtained, which, as well as good mechanical properties and very good tear propagation resistance, also has a glass transition temperature below 5° C., especially below 0° C., preferably a glass transition temperature below −5° C., more preferably below −10° C. In a further aspect, the present invention also relates to shaped bodies obtainable or obtained by a process as described above.

In principle, the shaped body (SC) may comprise bodies of all possible forms, for example extrusion products such as foils and other shaped bodies, and preferably comprises a foil, for example for floor coverings, ski foils, conveyor belts or injection moldings such as mining screens, spectacle frames, rolls, footwear parts, especially part of a footwear sole or a toecap.

In a further embodiment, the present invention accordingly relates to a shaped body as described above, wherein the shaped body is a foil or an injection molding.

Further embodiments of the present invention are apparent from the claims and the examples. It will be appreciated that the features of the subject matter/processes/uses according to the invention that are recited hereinabove and elucidated hereinbelow are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but do not restrict the present invention. In particular the present invention also encompasses those embodiments that result from the dependency references and hence combinations specified hereinafter. More particularly, in the case of naming of a range of embodiments hereinafter, for example the expression "The process according to any of embodiments 1 to 4", should be understood such that any combination of the embodiments within this range is explicitly disclosed to the person skilled in the art, meaning that the expression should be regarded as being synonymous to "The process according to any of embodiments 1, 2, 3 and 4".

1. A thermoplastic polyurethane obtainable or obtained by reacting at least components (i) to (iii):
   (i) at least one polyisocyanate composition,
   (ii) at least one chain extender, and
   (iii) at least one polyol composition,
   wherein the polyol composition comprises at least one polyol (P1) which has a molecular weight Mw in the range from 1500 to 2500 g/mol and has at least one aromatic polyester block (B1).
2. The thermoplastic polyurethane according to embodiment 1, wherein the polyol (P1) includes 10% to 50% by weight of the aromatic polyester blocks (B1), based on the overall polyester polyol (P1).
3. The thermoplastic polyurethane according to embodiment 1 or 2, wherein the aromatic polyester block (B1) is a polyester of an aromatic dicarboxylic acid and an aliphatic diol.
4. The thermoplastic polyurethane according to any of embodiments 1 to 3, wherein the aromatic polyester block (B1) is a polyethylene terephthalate block or a polybutylene terephthalate block.
5. The thermoplastic polyurethane according to any of embodiments 1 to 4, wherein the aromatic polyester block (B1) is a polyethylene terephthalate block.
6. The thermoplastic polyurethane according to any of embodiments 1 to 5, wherein the polyol (P1) has a molecular weight Mw in the range from 1700 to 2300 g/mol.
7. The thermoplastic polyurethane according to any of embodiments 1 to 6, wherein the polyol (P1) is obtained from an aromatic polyester having a molecular weight in the range from 10 000 to 14 000 g/mol.
8. The thermoplastic polyurethane according to any of embodiments 1 to 7, wherein the polyol (P1) is obtained by transesterification from an aromatic polyester having a molecular weight in the range from 10 000 to 14 000 g/mol.
9. The thermoplastic polyurethane according to any of embodiments 1 to 8, wherein the polyol (P1) is obtained by transesterification from a polyethylene terephthalate having a molecular weight in the range from 10 000 to 14 000 g/mol.
10. The thermoplastic polyurethane according to any of embodiments 1 to 9, wherein the chain extender used in (ii) is a diol having a molecular weight Mw<220 g/mol.
11. The thermoplastic polyurethane according to any of embodiments 1 to 10, wherein the chain extender used in (ii) and the polyol (P1) present in the polyol composition are used in a molar ratio of 40:1 to 1:10.
12. The thermoplastic polyurethane according to any of embodiments 1 to 11, wherein the polyol composition comprises a further polyol selected from the group consisting of polyetherols, polyesterols, polycarbonate alcohols and hybrid polyols.
13. The thermoplastic polyurethane according to any of embodiments 1 to 12, wherein the polyisocyanate is an aliphatic or aromatic diisocyanate.
14. A process for producing a shaped body (SC) comprising the following steps:
   (a) preparing a thermoplastic polyurethane comprising the reaction of
      (i) at least one polyisocyanate composition,
      (ii) at least one chain extender, and
      (iii) at least one polyol composition,
      wherein the polyol composition comprises at least one polyol (P1) which has a molecular weight Mw in the range from 1500 to 2500 g/mol and has at least one aromatic polyester block (B1);
   (b) producing a shaped body (SC) from the thermoplastic polyurethane.
15. The process according to embodiment 14, wherein the shaped body (SC) is produced in step (b) by means of extrusion, injection molding or sintering methods or from solution.
16. A shaped body obtainable or obtained by a process according to either of embodiments 14 and 15.
17. The shaped body according to embodiment 16, wherein the shaped body is a foil or an injection molding.
18. A thermoplastic polyurethane obtainable or obtained by reacting at least components (i) to (iii):
   (i) at least one polyisocyanate composition,
   (ii) at least one chain extender, and
   (iii) at least one polyol composition,
wherein the polyol composition comprises at least one polyol (P1) which has a molecular weight Mw in the range from 1500 to 2500 g/mol and has at least one aromatic polyester block (B1),
wherein the polyol (P1) includes 10% to 50% by weight of the aromatic polyester blocks (B1), based on the overall polyester polyol (P1), and wherein the aromatic polyester block (B1) is a polyethylene terephthalate block or a polyethylene terephthalate block.
19. A thermoplastic polyurethane obtainable or obtained by reacting at least components (i) to (iii):
   (i) at least one polyisocyanate composition,
   (ii) at least one chain extender, and
   (iii) at least one polyol composition,
wherein the polyol composition comprises at least one polyol (P1) which has a molecular weight Mw in the range from 1500 to 2500 g/mol and has at least one aromatic polyester block (B1),
wherein the polyol (P1) includes 10% to 50% by weight of the aromatic polyester blocks (B1), based on the overall polyester polyol (P1), and wherein the aromatic polyester block (B1) is a polyethylene terephthalate block.

20. The thermoplastic polyurethane according to either of embodiments 18 and 19, wherein the polyol (P1) is obtained from an aromatic polyester having a molecular weight in the range from 10 000 to 14 000 g/mol.

21. The thermoplastic polyurethane according to any of embodiments 18 to 20, wherein the polyol (P1) is obtained by transesterification from an aromatic polyester having a molecular weight in the range from 10 000 to 14 000 g/mol.

22. The thermoplastic polyurethane according to any of embodiments 18 to 21, wherein the polyol (P1) is obtained by transesterification from a polyethylene terephthalate having a molecular weight in the range from 10 000 to 14 000 g/mol.

23. The thermoplastic polyurethane according to any of embodiments 18 to 22, wherein the polyol (P1) has a molecular weight Mw in the range from 1700 to 2300 g/mol.

24. The thermoplastic polyurethane according to any of embodiments 18 to 23, wherein the chain extender used in (ii) is a diol having a molecular weight Mw<220 g/mol.

25. The thermoplastic polyurethane according to any of embodiments 18 to 24, wherein the chain extender used in (ii) and the polyol (P1) present in the polyol composition are used in a molar ratio of 40:1 to 1:10.

26. The thermoplastic polyurethane according to any of embodiments 18 to 25, wherein the polyol composition comprises a further polyol selected from the group consisting of polyetherols, polyesterols, polycarbonate alcohols and hybrid polyols.

27. The thermoplastic polyurethane according to any of embodiments 18 to 26, wherein the polyisocyanate is an aliphatic or aromatic diisocyanate.

28. A process for producing a shaped body (SC) comprising the following steps:
 (a) preparing a thermoplastic polyurethane comprising the reaction of
  (i) at least one polyisocyanate composition,
  (ii) at least one chain extender, and
  (iii) at least one polyol composition,
  wherein the polyol composition comprises at least one polyol (P1) which has a molecular weight Mw in the range from 1500 to 2500 g/mol and has at least one aromatic polyester block (B1);
 (b) producing a shaped body (SC) from the thermoplastic polyurethane,
  wherein the polyol (P1) includes 10% to 50% by weight of the aromatic polyester blocks (B1), based on the overall polyester polyol (P1), and wherein the aromatic polyester block (B1) is a polyethylene terephthalate block or a polyethylene terephthalate block.

29. The process according to embodiment 28, wherein the aromatic polyester block (B1) is a polyethylene terephthalate block.

30. The process according to any of embodiments 28 to 29, wherein the polyol (P1) has a molecular weight Mw in the range from 1700 to 2300 g/mol.

31. The process according to any of embodiments 28 to 30, wherein the chain extender used in (ii) is a diol having a molecular weight Mw<220 g/mol.

32. The process according to any of embodiments 28 to 31, wherein the chain extender used in (ii) and the polyol (P1) present in the polyol composition are used in a molar ratio of 40:1 to 1:10.

33. The process according to any of embodiments 28 to 32, wherein the shaped body (SC) is produced in step (b) by means of extrusion, injection molding or sintering methods or from solution.

34. A shaped body obtainable or obtained by a process according to any of embodiments 28 to 33.

35. The shaped body according to embodiment 34, wherein the shaped body is a foil or an injection molding.

The examples below serve to illustrate the invention, but are in no way restrictive in respect of the subject matter of the present invention.

EXAMPLES

1 The Following Feedstocks were Used:
 Polyol 1: polyester polyol based on adipic acid, butane-1,4-diol and hexane-1,6-diol with an OH number of 56, functionality: 2
 Polyol 2: polyester polyol based on adipic acid, ethylene glycol and diethylene glycol with an OH number of 56, functionality: 2
 Polyol 3: polyester polyol based on adipic acid, ethylene glycol and butane-1,4-diol with an OH number of 56, functionality: 2
 Polyol 4: polyester polyol based on PET, adipic acid, butane-1,4-diol and hexane-1,6-diol with an OH number of 54.4, functionality: 2
 Polyol 5: polyester polyol based on adipic acid, PET and diethylene glycol with an OH number of 50, functionality: 2
 Polyol 6: polyester polyol based on adipic acid, PET and butane-1,4-diol with an OH number of 49.4, functionality: 2
 PET polyethylene terephthalate in the form of flakes with an average molecular weight Mw of 12 000 g/mol
 Isocyanate 1 methylene diphenyl 4,4'-diisocyanate
 Isocyanate 2 hexamethylene 1,6-diisocyanate
 CE 1: butane-1,4-diol
 CE 2: hexane-1,6-diol
 Catalyst 1: bismuth catalyst
 Stabilizer 1: hydrolysis stabilizer based on polycarbodiimide
 Stabilizer 2: sterically hindered amine 1
 Stabilizer 3: sterically hindered phenol
 Stabilizer 4: sterically hindered amine 2
 Additive 1: plasticizer based on a carboxylic ester 2 Synthesis of the Polyester Polyols with PET Blocks 2.1 Synthesis of Polyol 4

A 4000 ml round-neck flask provided with PT100 thermocouple, nitrogen inlet, stirrer, column, column head, Anschütz-Thiele attachment and heating mantle is initially charged with 1111.26 g of adipic acid, 406.69 g of butane-1,4-diol (3% excess) and 533.32 g of hexane-1,6-diol (3% excess). The mixture is then heated to 120° C. until a homogeneous mixture is formed. 750 g of polyethylene terephthalate (PET) are then added to the mixture in the form of flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number <1.0 mg KOH/g is obtained.

The polymer obtained has the following properties:
Hydroxyl number: 54.4 mg KOH/g
Acid number: 0.48 mg KOH/g
Viscosity at 75° C.: 2024 mPas 2.2 Synthesis of Polyol 5

A 4000 ml round-neck flask provided with PT100 thermocouple, nitrogen inlet, stirrer, column, column head, Anschütz-Thiele attachment and heating mantle is initially charged with 1099.59 g of adipic acid and 921.43 g of diethylene glycol (no excess). The mixture is then heated to 120° C. until a homogeneous mixture is formed. 750 g of polyethylene terephthalate (PET) are then added to the mixture in the form of flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number <1.0 mg KOH/g is obtained.

The polymer obtained has the following properties:
Hydroxyl number: 50 mg KOH/g
Acid number: 0.38 mg KOH/g
Viscosity at 75° C.: 1936 mPas 2.3 Synthesis of Polyol 6

A 4000 ml round-neck flask provided with PT100 thermocouple, nitrogen inlet, stirrer, column, column head, Anschütz-Thiele attachment and heating mantle is initially charged with 1200.99 g of adipic acid and 870.38 g of butane-1,4-diol (3% excess). The mixture is then heated to 120° C. until a homogeneous mixture is formed. 750 g of polyethylene terephthalate (PET) are then added to the mixture in the form of flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number <1.0 mg KOH/g is obtained.

The polymer obtained has the following properties:
Hydroxyl number: 49.4 mg KOH/g
Acid number: 0.6 mg KOH/g
Viscosity at 75° C.: 4423 mPas 3 Methods 3.1 Determination of Viscosity:

Unless stated otherwise, the viscosity of the polyols was determined that 75° C. to DIN EN ISO 3219 (Jan. 10, 1994 edition) with a Rheotec RC 20 rotary viscometer using the CC 25 DIN spindle (spindle diameter: 12.5 mm; internal measuring cylinder diameter: 13.56 mm) at a shear rate of 50 1/s.

3.2 Measurement of Hydroxyl Number:

Hydroxyl numbers were determined by the phthalic anhydride method DIN 53240 (Jan. 12, 1971 edition) and reported in mg KOH/g.

3.3 Measurement of Acid Number:

Acid number was determined to DIN EN 1241 (Jan. 5, 1998 edition) and is reported in mg KOH/g.

General Preparation Example

The polyols were initially charged in a container at 60 to 80° C. and mixed by vigorous stirring with the components according to table 1 or 2. The reaction mixture was heated to above 100° C. and was then poured out onto a heated, Teflon-coated table. The cast slab obtained was heat-treated at 80° C. for 15 hours, then pelletized and processed by injection molding.

TABLE 1

Comparative compounds used

|  | Comparison 1 | Comparison 2 | Comparison 3 | Comparison 4 |
|---|---|---|---|---|
| Polyol 1 [g] | 940 | | | |
| Polyol 2 [g] | | 950 | | |
| Polyol 3 [g] | | | 800.0 | |
| | | | | 1100 |
| CE 1 [g] | 115.5 | 116.7 | 100.9 | |
| CE 2 [g] | | | | 123 |
| Isocyanate 1 [g] | 440.7 | 446.4 | 384 | |
| Isocyanate 2 [g] | | | | 270.3 |
| Catalyst 1 [µl] | | | | 600 |
| Stabilizer 1 [g] | 3.8 | 7.6 | 6.4 | 8.8 |
| Stabilizer 2 [g] | | | | 4.6 |
| Stabilizer 3 [g] | | | | 7.6 |
| Stabilizer 4 [g] | | | | 3 |
| Additive 1 [g] | | 80 | | |
| Index | 1000 | 1000 | 1000 | 1000 |
| Hard segment content | 29.2% | 29.2% | 29.7% | 20% |
| Starting temperature | 80° C. | 80° C. | 80° C. | 80° C. |
| Casting temperature | 110° C. | 110° C. | 110° C. | 110° C. |

TABLE 2

Example compounds used

|  | Example 1 | Example 2 | Example 3 | Example 4 |
|---|---|---|---|---|
| Polyol 4 [g] | 720 | | | |
| Polyol 5 [g] | | 950 | | |
| Polyol 6 [g] | | | 850 | |
| | | | | 1100 |
| CE 1 [g] | 88.2 | 115.9 | 103.1 | |
| CE 2 [g] | | | | 122.4 |
| Isocyanate 1 [g] | 335.7 | 436.7 | 384 | |
| Isocyanate 2 [g] | | | | 263.7 |
| Stabilizer 1 [g] | 7.2 | 7.6 | 8.5 | 8.8 |
| Stabilizer 2 [g] | | | | 4.5 |
| Stabilizer 3 [g] | | | | 7.6 |
| Stabilizer 4 [g] | | | | 3 |
| Additive 1 [g] | | 79.5 | | |
| Index | 1000 | 1000 | 1000 | 1000 |
| Hard segment content | 29.2% | 29.2% | 29.2% | 20% |
| Starting temperature | 60° C. | 80° C. | 60° C. | 80° C. |
| Casting temperature | 100° C. | 110° C. | 100° C. | 110° C. |

5 Mechanical Properties

The measurements collated in the tables which follow were established from injection-molded sheets of comparisons 1 to 4 and examples 1 to 4.

The following properties of the obtained polyurethanes were determined by the recited methods:

Hardness: DIN ISO 7619-1

Tensile strength and elongation at break: DIN 53504

Tear propagation resistance: DIN ISO 34-1, B (b)

Abrasion measurement: DIN ISO 4649

Dynamic-mechanical thermoanalysis: DN EN ISO 6721

The Tg values are based on DMTA measurements and were read off from the G" modulus.

TABLE 3

Mechanical properties of aromatic TPUs with polyesters of relatively high molecular weight

| | Shore hardness | Tensile strength [MPa] | Tear propagation resistance [kN/m] | Abrasion [mm$^3$] | Tg (DMA, G″) [° C.] |
|---|---|---|---|---|---|
| Comparison 1 | 88 A | 47 | 78 | 43 | |
| Example 1 | 89 A | 48 | 110 | 32 | −15 |
| Comparison 2 | 85 A | 41 | 73 | 78 | |
| Example 2 | 87 A | 54 | 96 | 49 | −10 |
| Comparison 3 | 86 A | 45 | 81 | 36 | |
| Example 3 | 88 A | 50 | 115 | 33 | −10 |

TABLE 4

Mechanical properties of aliphatic TPUs

| | Shore hardness | Tensile strength [MPa] | Tear propagation resistance [kN/m] | Abrasion [mm$^3$] | Tg (DMA, G″) [° C.] |
|---|---|---|---|---|---|
| Comparison 4 | 83 A | 18 | 39 | 197 | |
| Example 4 | 86 A | 22 | 71 | 60 | −20 |

CITED LITERATURE

U.S. Pat. No. 5,496,496
U.S. Pat. No. 4,062,825
U.S. Pat. No. 4,202,950
EP 2 687 552 A1
Kunststoffhandbuch, volume 7, "Polyurethane", Carl Hanser Verlag, 3rd edition, 1993, chapter 3.1
Kunststoffhandbuch, volume 7, Carl Hanser Verlag, 1st edition 1966, p. 103-113

The invention claimed is:

1. A thermoplastic polyurethane obtained by reacting at least the following components (i) to (iii):
   (i) at least one polyisocyanate composition,
   (ii) at least one chain extender, and
   (iii) at least one polyol composition,
   wherein the at least one polyol composition comprises a polyol (P1) which has at least one aromatic polyester block (B1) and at least one aliphatic polyester block,
   wherein polyol (P1) is prepared by reacting an aromatic polyester which has a higher molecular weight than the blocks (B1) present in the polyol (P1); and
   wherein the at least one polyol composition comprises a further polyol selected from the group consisting of a polyetherol, a polyesterol, a polycarbonate alcohol and a hybrid polyol.

2. The thermoplastic polyurethane of claim 1, wherein the polyol (P1) comprises 10% to 50% by weight of the at least one aromatic polyester block (B1), based on a total weight of the polyol (P1).

3. The thermoplastic polyurethane of claim 1, wherein the at least one aromatic polyester block (B1) comprises a polyester of an aromatic dicarboxylic acid and an aliphatic diol.

4. The thermoplastic polyurethane of claim 1, wherein the at least one aromatic polyester block (B1) comprises a polyethylene terephthalate block or a polybutylene terephthalate block.

5. The thermoplastic polyurethane of claim 1, wherein the at least one aromatic polyester block (B1) comprises a polyethylene terephthalate block.

6. The thermoplastic polyurethane of claim 1, wherein the at least one chain extender comprises a diol having a molecular weight <220 g/mol.

7. The thermoplastic polyurethane of claim 1, wherein the at least one chain extender and the polyol (P1) present in the at least one polyol composition are used in a molar ratio of from 40:1 to 1:10.

8. The thermoplastic polyurethane of claim 1, wherein the at least one polyisocyanate composition comprises an aliphatic or aromatic diisocyanate.

9. A process for producing a shaped body (SC), the process comprising:
   (a) preparing a thermoplastic polyurethane, the preparing comprising the reaction of
   (i) at least one polyisocyanate composition,
   (ii) at least one chain extender, and
   (iii) at least one polyol composition,
   wherein the at least one polyol composition comprises a polyol (P1) which has at least one aromatic polyester block (B1) ad at least one aliphatic polyester block,
   wherein polyol (P1) is prepared by reacting an aromatic polyester which has a higher molecular weight than the blocks (B1) present in the polyol (P1); and
   wherein the at least one polyol composition comprises a further polyol selected from the group consisting of a polyetherol, a polyesterol, a polycarbonate alcohol and a hybrid polyol and
   (b) producing a shaped body (SC) from the thermoplastic polyurethane.

10. The process of claim 9, wherein the shaped body (SC) of (b) is produced by extrusion, injection molding or sintering methods or from solution.

11. A shaped body obtained by the process of claim 9.

12. The shaped body of claim 11, wherein the shaped body is a foil or an injection molding.

* * * * *